United States Patent [19]
Takenaka et al.

[11] Patent Number: 5,556,260
[45] Date of Patent: Sep. 17, 1996

[54] MULTIPLE-CYLINDER PISTON TYPE REFRIGERANT COMPRESSOR

[75] Inventors: Kenji Takenaka; Hiroaki Kayukawa; Masafumi Ito; Osamu Hiramatsu; Suguru Hirota; Taro Ozeki, all of Kariya, Japan

[73] Assignee: Kabushiki Kaisha Toyoda Jidoshokki Seisakusho, Kariya, Japan

[21] Appl. No.: 234,311

[22] Filed: Apr. 28, 1994

[30] Foreign Application Priority Data

Apr. 30, 1993 [JP] Japan ................................. 5-103902
Nov. 12, 1993 [JP] Japan ................................. 5-283638

[51] Int. Cl.$^6$ ........................... F04B 27/08; F04B 39/00
[52] U.S. Cl. ........................................ 417/269; 417/312
[58] Field of Search .................................. 417/269, 312, 417/521; 92/57; 91/474, 499

[56] References Cited

U.S. PATENT DOCUMENTS

| | | | |
|---|---|---|---|
| 3,514,223 | 5/1970 | Hare | 91/499 |
| 4,583,922 | 4/1986 | Iijima et al. | 417/312 |
| 4,761,119 | 8/1988 | Nomura et al. | 417/269 |
| 4,763,563 | 8/1988 | Ikeda et al. | 92/57 |
| 5,252,032 | 10/1993 | Iwanami et al. | 417/269 |
| 5,304,042 | 4/1994 | Kayukawa et al. | 417/269 |

*Primary Examiner*—Timothy S. Thorpe
*Assistant Examiner*—William Wicker
*Attorney, Agent, or Firm*—Brooks Haidt Haffner & Delahunty

[57] ABSTRACT

A multiple-cylinder piston type compressor is disclosed. The compressor has a cylinder head fastened to the rear end of a cylinder block assembly of the compressor with a valve plate interposed therebetween and having formed therein a suction chamber formed in a radially outer peripheral region thereof so as to surround a central discharge chamber. The compressor further includes a refrigerant gas intake passage extending along a straight line and radially through the axial center of the compressor and having at least two holes for providing direct communication between the gas intake passage and the suction chamber at positions that are radially spaced. The refrigerant gas intake passage may include a combination of at least two passage portions having different cross-sectional areas.

11 Claims, 5 Drawing Sheets

MULTIPLE-CYLINDER PISTON TYPE REFRIGERANT COMPRESSOR

BACKGROUND OF THE INVENTION

The present invention relates generally to a multiple-cylinder piston type refrigerant compressor adapted for use, for example, in an automotive air conditioning system, and more specifically to an arrangement of a refrigerant gas intake passage leading to a suction chamber of the compressor for reducing the difference in the suction pressure of refrigerant gas drawn into respective cylinder bores of the compressor.

The present invention is applicable to a constant-displacement swash plate type compressor, as well as to a variable-displacement compressor equipped with a wobble plate disposed so as to change its angle of inclination relative to a drive shaft on which it is supported, as disclosed, e.g, in U.S. Pat. No. 5,056,416. For aiding in understanding of the present invention, reference is made firstly to FIGS. 7 and 8 showing a rear end portion of a conventional refrigerant compressor in transverse section and fragmentary longitudinal section, respectively.

The compressor includes a rear cylinder block 1 axially combined with a front cylinder block (not shown) to thereby form a cylinder block assembly having defined therein a plurality of axial cylinder bores 2 arranged around the central axis of the cylinder block assembly, one of which cylinder bores is shown in FIG. 8, each receiving therein a reciprocatory piston 7. A cylinder head or a rear housing 6 is bolted to the axial rear end of the cylinder block 1 with a valve plate 5 interposed therebetween. The cylinder head 6 cooperates with the valve plate 5 to form a discharge chamber 8 in the central region and a suction chamber 9 in the radially outer peripheral region of the cylinder head. The valve plate 5 has a suction port 3a and a discharge port 4 allowing communication between each cylinder bore 2 and the suction chamber 9 and the discharge chamber 8, respectively, and such communication is controlled by flexible reed type suction and discharge valves arranged on opposite sides of the valve plate 5. As shown clearly in FIG. 7, there is provided a refrigerant gas inlet 12 having formed therein a gas intake passage 13 in communication with the suction chamber 9 and connected to an evaporator (not shown) of the refrigeration system via an external conduit (not shown) through which a refrigerant gas under a suction pressure is supplied to the compressor. The discharge chamber 8 communicates directly with a delivery passage 11 bored in a refrigerant gas outlet 10 through which a refrigerant gas under a discharge pressure is delivered out of the compressor to a condenser (not shown) of the refrigeration system via an external conduit (not shown) connected to the gas outlet 10.

Though not shown in the drawings, the pistons 7 are driven to reciprocate in the corresponding cylinder bores 2 by a rotary swash plate (not shown) driven to rotate by a drive shaft (not shown) rotatably supported in the cylinder block assembly.

In operation of the above-described compressor, a refrigerant gas fed through the passage 13 is drawn into the suction chamber 9 and subsequently introduced through the suction ports 3a–3d in the valve plate 5 into the cylinder bores 2, in which the refrigerant gas is compressed by the reciprocating motion of the pistons 7. The compressed refrigerant gas is pumped out of the cylinder bores 2 through the discharge ports 4 into the central discharge chamber 8, from which the compressed gas is discharged out of the compressor through the delivery passage 11.

As seen from FIG. 7, the suction chamber 9 of this type of compressor is often configured in a complicated manner because of various restricting factors in the design of a compressor, so that the flow of refrigerant gas in the suction chamber is subjected to resistance and also the distances from the gas intake passage 13 to the respective suction ports 3a–3d are different. In such an arrangement of the suction chamber 9, the suction pressure of the refrigerant gas becomes lower at suction ports 3a–3d which are located further from the intake passage 13, as seen in the counterclockwise gas flowing direction in the suction chamber 9 in FIG. 7, and, therefore, an appreciable suction pressure difference occurs from a pressure drop or loss between the suction port 3a which is positioned closest to the gas intake passage 13 and the suction port 3a which is located most remote therefrom. At a compressor speed of 3,000 rpm, for example, the pressure difference amounts to about 0.5 to 1 $kg/cm^2$, with the result that the volumetric efficiency of the compressor is not only affected, but also the difference in the suction pressure causes pulsation of the refrigerant gas which in turn develops vibration and noise of compressor parts.

SUMMARY OF THE INVENTION

It is an object of the invention, therefore, to provide a multiple-cylinder piston type refrigerant compressor which can solve the above-identified problems.

In a multiple-cylinder piston type compressor according to the invention, there is provided a cylinder head fastened to the rear end of a cylinder block assembly of the compressor with a valve plate interposed therebetween and having a suction chamber formed in a radially outer region thereof so as to surround a central discharge chamber. The compressor further includes a straight refrigerant gas intake passage means disposed to receive therein a refrigerant gas from a refrigeration circuit in which the compressor is arranged, and having openings or communicating passages for providing direct communication between the gas intake passage means and the suction chamber at a plurality of regions thereof. In one preferred embodiment of the invention, the openings or hole means of the refrigerant gas intake passage means includes two holes which are spaced from one another on opposite sides of the axial center of the compressor along a line extending radially through said axial center. Because the refrigerant gas can flow through the less resistant passage and the difference of the distance to the respective suction ports is decreased, the pressure differential at the suction ports and hence the difference in the suction pressure of gas drawn into the respective cylinder bores is lessened.

The refrigerant gas intake passage means may have at least two communicating passage portions having different cross-sectional areas so that harmful pulsation of the refrigerant gas is damped out in the gas intake passage portions. According to a preferred embodiment of the invention, the refrigerant gas intake passage means includes a reduced passage portion and an enlarged passage portion which is shaped oblong in cross section thereof so that the damping effect is achieved without substantially enlarging the axial dimension of the compressor.

Thus, the refrigerant gas intake passage means provides a smoother flow of refrigerant gas to the respective suction ports, thereby reducing the pressure loss of the gas drawn into the respective cylinder bores through the suction ports. As a result, the pressure differential of the refrigerant gas under a suction pressure is lessened and, therefore, pulsation of the gas due to such pressure differential can be prevented successfully. By providing the refrigerant gas intake means as a combination of a plurality of passage portions having different cross-sectional areas, gas pulsation at a relatively high frequency which is caused by the vibration of suction valves on the valve plate is attenuated.

The above and other objects and features of the invention will be apparent from the following detailed description of the preferred embodiments thereof in conjunction with the accompanying drawings.

DETAILED DESCRIPTION OF PREFERRED EMBODIMENT

Figure 1:
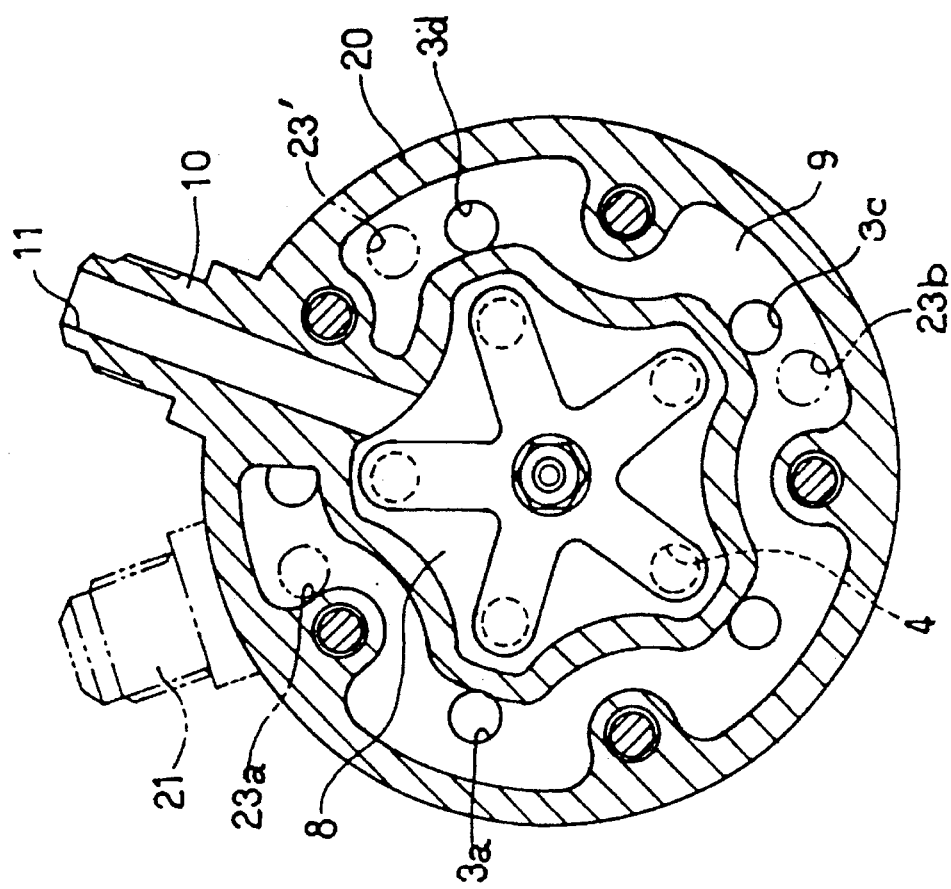
FIG. 1 is a transverse cross-sectional view of a cylinder head at the rear end of a multiple-cylinder piston type refrigerant compressor constructed according to the present invention.
Figure 2:
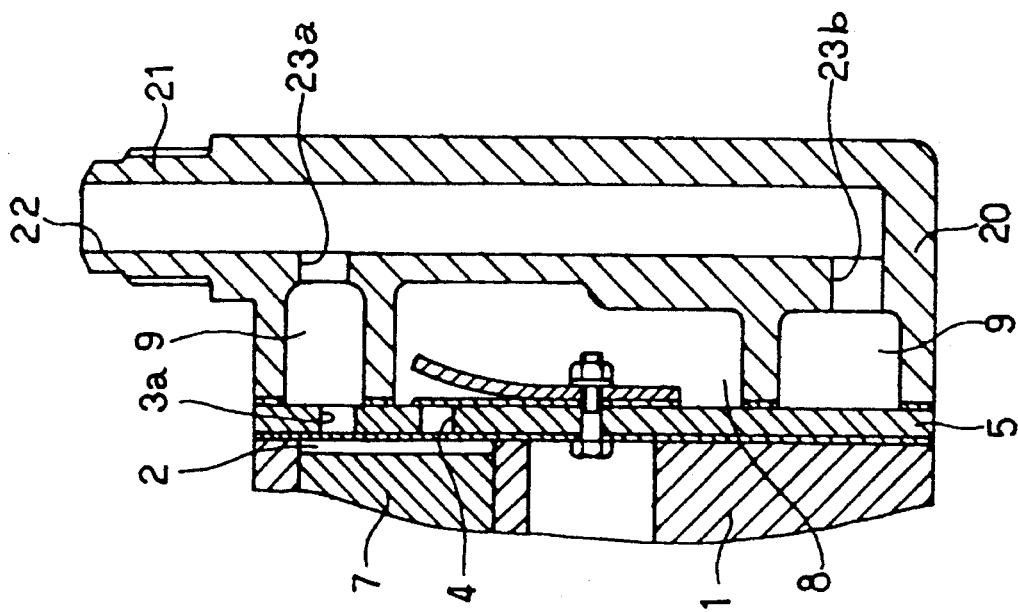
FIG. 2 is fragmentary longitudinal cross-sectional view of the rear end portion of the compressor, showing a refrigerant gas intake passage formed in the cylinder head.
Figure 3:
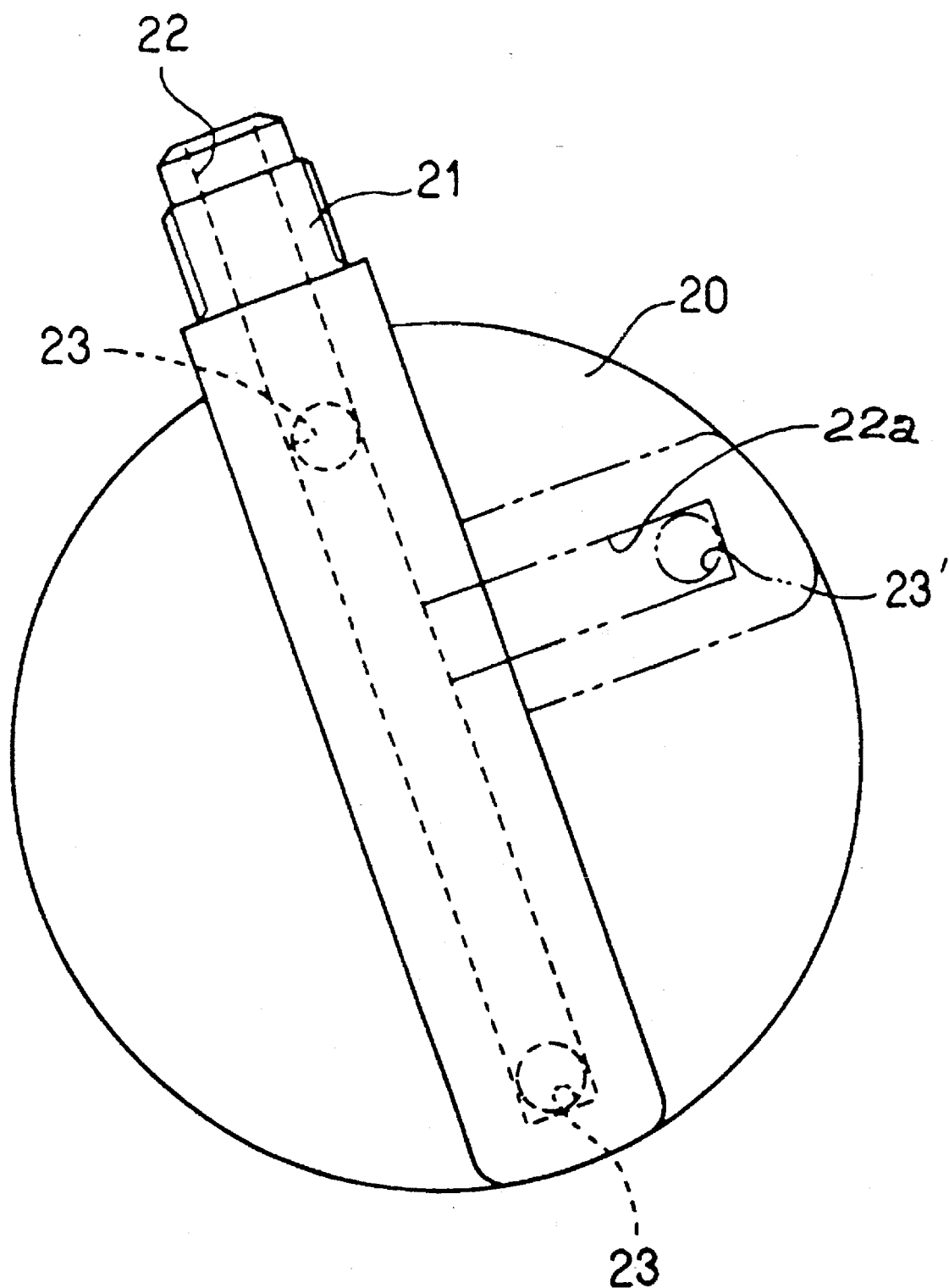
FIG. 3 is an end view of the compressor showing the refrigerant gas intake passage.
Figure 7:
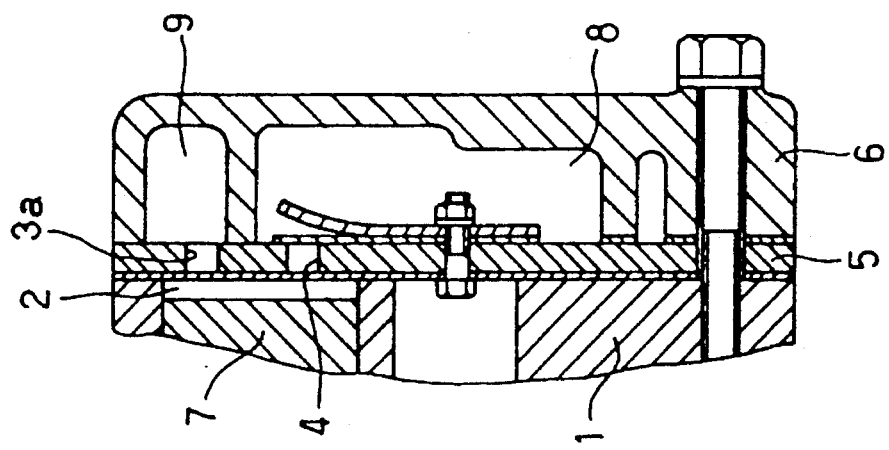
FIG. 7 is a transverse cross-sectional view of a cylinder head at a rear end portion of a conventional multiple-cylinder piston type refrigerant compressor.
Figure 8:
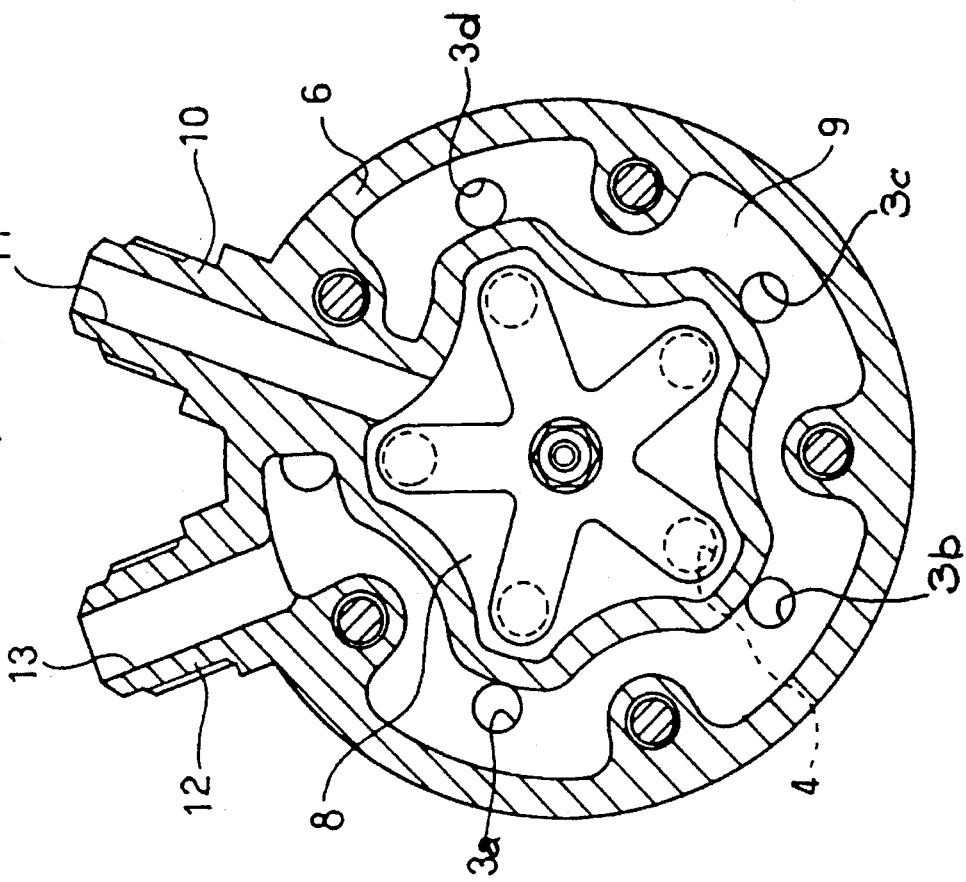
FIG. 8 is a fragmentary longitudinal cross-sectional view of the rear end portion of the compressor of FIG. 7.

Referring to FIGS. 1 to 3, there is illustrated a rear end portion of a multiple-cylinder piston type refrigerant compressor constructed according to the present invention. Since those elements of the compressor which are designated by the same reference numerals as those of the conventional compressor described previously with reference to FIGS. 7 and 8 have substantially the same construction and function as their counterparts, detailed description thereof will be omitted.

The compressor has a cylinder head 20 fastened to the outer end of the rear cylinder block 1 with the valve plate 5 interposed therebetween. As shown in FIGS. 2 and 3, the cylinder head 20 has on its outer end an integral gas inlet 21 in which a first refrigerant gas intake passage 22 is formed. The passage 22 is formed straight, extending radially through the axis of the compressor and having two holes 23a, 23b establishing communication between the gas intake passage 22 and the suction chamber 9 at two different spaced locations. As shown clearly by phantom circles 23a, 23b in FIG. 1, one of the communication holes is located at a position which is just opposite to the other one with respect to the axial center of the compressor.

In operation of the compressor, a refrigerant gas drawn into the gas intake passage 22 is introduced into each cylinder bore 2, whose piston 7 is then in suction stroke, mainly through one of the communication holes 23a, 23b which is closer to the suction port 3a–3d for that cylinder bore. Thus, the refrigerant gas introduced into the cylinder bores through the suction ports 3d located circumferentially relatively remote from the suction port 3a that is shown at the top in FIG. 2 is subjected to less resistance than heretofore because the gas can travel through the straight and hence less resistant passage 22 without flowing all the way through the complicated and hence resistant passage defined by the suction chamber 9. Therefore, the pressure loss of the refrigerant gas due to such resistance can be reduced. Accordingly, the pressure differential of the gas drawn into the respective cylinder bores 2 is lessened, so that harmful pulsation of the gas due to such pressure differential is prevented.

As indicated by the phantom lines in FIG. 3, a second intake passage 22a interconnects with the first passage 22, the passages 22 and 22a being T-shaped in configuration and having a third hole 23' at one end of the second gas intake passage 22a and adjacent the suction port 3d that is circumferentially the most remote along the counter-clockwise gas flowing direction in the suction chamber 9, from the first suction port 3a shown in FIG. 2. Apparently, the provision of the hole 23' further reduces the pressure loss and hence the pressure differential.

Figure 4:
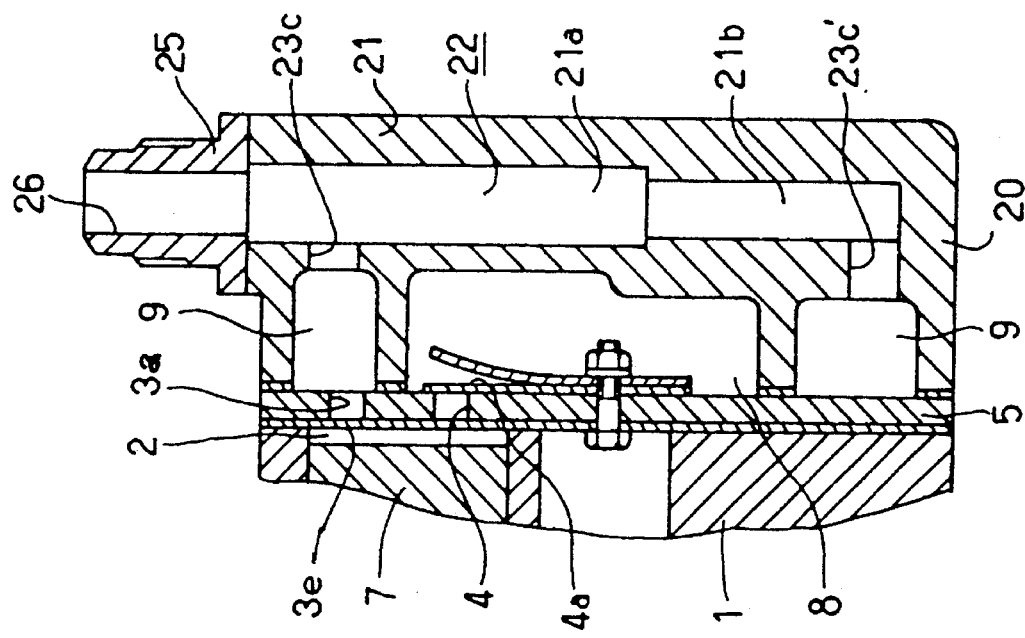
FIG. 4 is a longitudinal cross-sectional view of a rear end portion of a compressor according to a modified embodiment of the invention.
Figure 5:
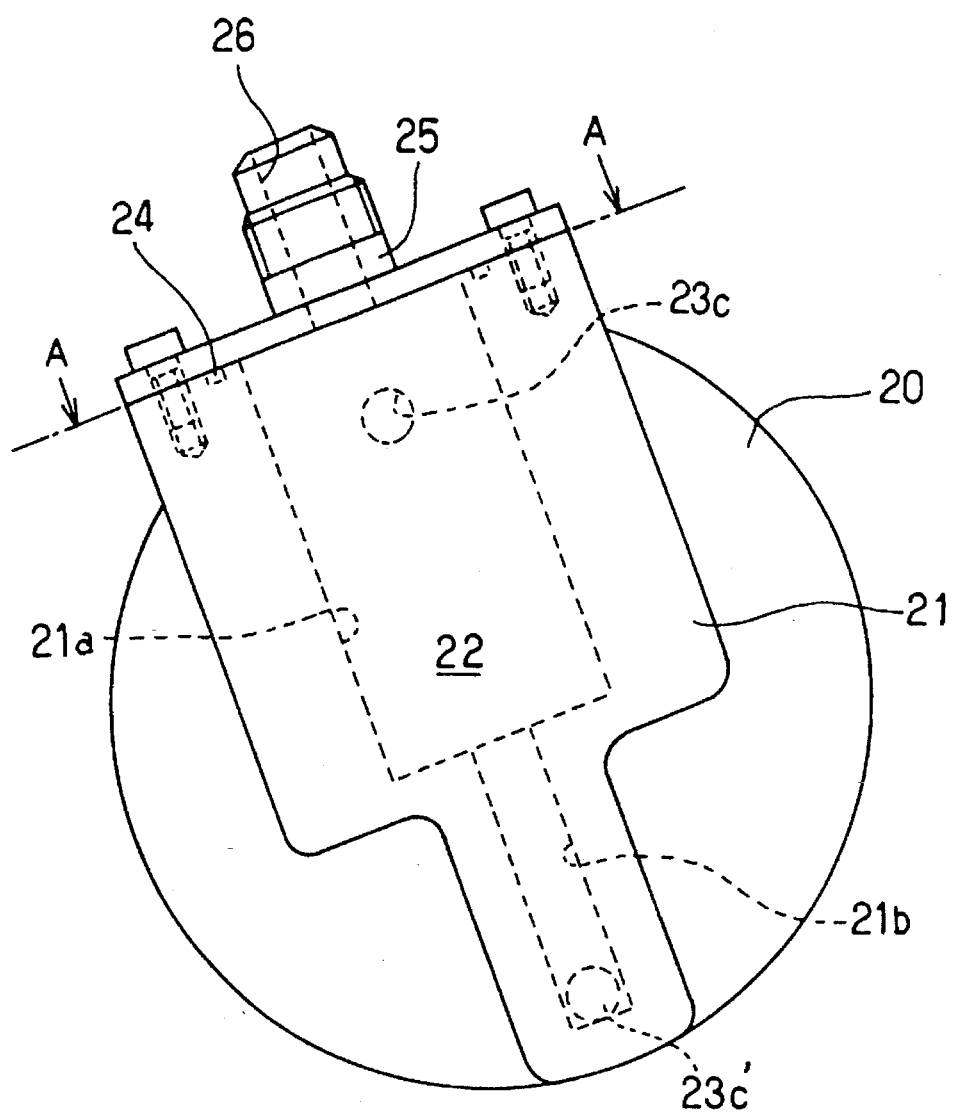
FIG. 5 is an end view of the compressor of FIG. 4.
Figure 6:
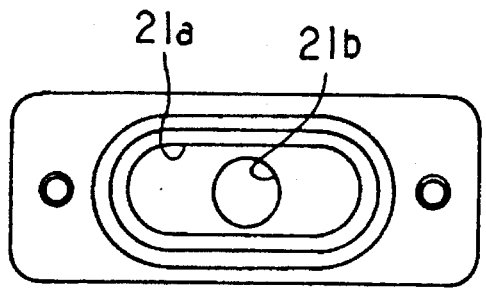
FIG. 6 is a cross section taken along line A—A of FIG. 5.

Now referring to FIGS. 4 to 6 showing another preferred embodiment of the invention, the refrigerant gas intake passage 22 formed in the cylinder head 20 is shaped so as to have a first enlarged portion 21a which is in direct communication with a gas feed bore 26 formed in a fitting 25 fastened to the cylinder head and sealed by a seal ring 24, and connected to an external conduit (not shown) leading to an evaporator (not shown), and a second reduced portion 21b which is formed in the cylinder head in communication with the first enlarged gas passage portion 21a. In the cylinder head 20 are formed two holes 23c, 23c' for communication between the suction chamber 9 and the enlarged passage portion 21a and the reduced passage portion 21b, respectively. As in the first embodiment, one of the two communication holes 23c, 23c' is radially spaced from the other along a phantom line passing through the axial center of the compressor. Such configuration of the gas intake passage 22 by combination of the two passage portions 21a, 21b having different cross-sectional areas provides a muffler effect to attenuate or dampen out pulsation of the refrigerant gas. As shown clearly in FIG. 6, the enlarged passage portion 21a has an oblong shape and the reduced portion 21b has a circular shape in transverse section, respectively, so that the damping effect is obtainable without substantially enlarging the axial dimension of the compressor.

In this embodiment, not only is the pressure loss of the refrigerant gas reduced as in the first embodiment, but pulsation of the gas with a relatively low frequency due to the pressure loss is decreased, accordingly. It is noted that the gas passage 22 formed by a combination of the enlarged and reduced passage portions 21a, 21b also attenuates the gas pulsation with a relatively high frequency which is caused by the vibration of the suction valves 3e for the respective cylinder bores 2.

It is to be understood that the present invention can be embodied in other forms and modifications without departing the spirit of the invention. For example, the gas inlets 21 in which the intake passages 22 are formed are not required to be integral with the cylinder head 20 as in the above embodiments, but they may be made as a separate part and attached to the cylinder head in any suitable manner.

What is claimed is:

1. A multiple-cylinder piston type compressor for a refrigeration system comprising:

an axially extending cylinder block means having a plurality of axial cylinder bores arranged around the central axis thereof;

a plurality of reciprocatory pistons received in said axial cylinder bores of said cylinder block means;

a cylinder head arranged so as to close one axial end of said cylinder block means with a valve plate interposed therebetween and having therein a discharge chamber and a suction chamber, said discharge chamber being formed in a radially central region of said cylinder head and said suction chamber being formed in a radially outer region thereof surrounding said discharge chamber; and a refrigerant gas intake passage for receiving a refrigerant gas and having communicating passages providing direct communication between said gas intake passage and said suction chamber at two circumferentially spaced apart locations within said suction chamber, said refrigerant gas intake passage extending straight between said two locations.

2. A multiple-cylinder piston type compressor according to claim 1, wherein said two of said locations are provided within said suction chamber, said two locations being spaced from one another along a line extending radially through the axial center of said compressor.

3. A multiple-cylinder piston type compressor according to claim 1, wherein said refrigerant gas intake passage includes at least two passage portions having different cross-sectional areas and in direct communication with each other.

4. A multiple-cylinder piston type compressor according to claim 1, wherein said refrigerant gas intake passage is formed in said cylinder head.

5. A multiple-cylinder piston type compressor according to claim 1, wherein said communicating passages have two openings within said cylinder head for providing said direct communication with the respective of said locations within said suction chamber.

6. A multiple-cylinder piston type compressor according to claim 5, wherein said communicating passages provide direct communication between said refrigerant gas intake passage and said suction chamber at a third location within said suction chamber which is circumferentially spaced apart from each of said two locations, and said communicating passages comprise a third opening within said cylinder head for providing said direct communication with said third location, and said refrigerant gas intake passage comprises an interconnected additional straight passage extending to said third opening.

7. A multiple-cylinder piston type compressor according to claim 1, which further comprises a second gas intake passage interconnected with and extending radially from the first said gas intake passage, said second gas intake passage having at least one communicating passage for providing direct communication to said suction chamber.

8. A multiple-cylinder piston type compressor according to claim 7, wherein said interconnected first and second gas intake passages have a T-shaped configuration, the first said gas intake passage providing the top of said T-shape, and said second gas intake passage being substantially perpendicular to the first said gas intake passage to provide the leg of said T-shape.

9. A multiple-cylinder piston type compressor according to claim 1, wherein said refrigerant gas intake passage comprises interconnected first and second portions, said first portion being proximal to the location of intake of said gas to said gas intake passage and said second portion being distal to said location of intake of said gas, the cross-sectional area of said first portion being larger than the cross-sectional area of said second portion.

10. A multiple-cylinder piston type compressor according to claim 9, wherein said first portion cross-sectional area is oblong in shape, and said second portion cross-sectional area is circular in shape.

11. A multiple-cylinder piston type compressor according to claim 10, wherein said communicating passages include at least one opening in said first portion and at least one opening in said second portion.

* * * * *